United States Patent

[11] 3,591,147

[72] Inventors Terry O. Anderson;
Darryl W. Rogers, both of Duncan, Okla.
[21] Appl. No. 771,954
[22] Filed Oct. 30, 1968
[45] Patented July 6, 1971
[73] Assignee Halliburton Company
Duncan, Okla.

[54] AUTOMATED METHOD AND APPARATUS FOR MIXING MUD FOR USE IN WELL OPERATIONS
22 Claims, 11 Drawing Figs.
[52] U.S. Cl. .................................................. 259/154,
259/165
[51] Int. Cl. ................................................. B28c 7/04
[50] Field of Search.......................................... 259/154,
149, 164, 165, 168, 161, 162, 163

[56] References Cited
UNITED STATES PATENTS
| | | | |
|---|---|---|---|
| 3,170,677 | 2/1965 | Phister | 259/154 |
| 3,256,181 | 6/1966 | Zingg | 259/154 |
| 3,300,193 | 1/1967 | Badgett | 259/154 |
| 3,379,421 | 4/1968 | Putman | 259/154 |

Primary Examiner—Robert W. Jenkins
Attorney—Burns, Doane, Benedict, Swecker & Mathis ABSTRACT: Method and apparatus for mixing mud for use in well operations, including independently operable high and low capacity systems for supplying mud solids to a mixing tank. A radioactive, density measuring control system is employed which controls the rate of solids supply, with the same calibration setting being maintained for high and low rates of addition of solids material to the mud. A pneumatic conveying system is employed to convey the solids through the system. Vane-type feeders and mud shrouds are employed to minimize the dust level during the mud mixing operation.

FIG. 1

INVENTORS
TERRY O. ANDERSON
DARRYL W. ROGERS

BY

Burns, Doane, Benedict, Swecker & Mathis
ATTORNEYS

INVENTORS
TERRY O. ANDERSON
DARRYL W. ROGERS

INVENTORS
TERRY O. ANDERSON
DARRYL W. ROGERS

BY
Burns, Doane, Benedict, Swecker & Mathis
ATTORNEYS

AUTOMATED METHOD AND APPARATUS FOR MIXING MUD FOR USE IN WELL OPERATIONS

GENERAL BACKGROUND, OBJECTS AND SUMMARY OF THE INVENTION

Modern well-drilling operations are complex and costly operations.

A necessary facet of most drilling operations relates to the circulation of drilling mud through a well bore.

The function of the drilling mud is to remove cuttings, lubricate the drilling bit, and provide a fluid of sufficient density in the borehole to prevent formation fluids from "blowing out" or erupting out of the well bore.

During drilling operations, the solids content of drilling mud may be reduced as a result of the solids "caking out" on the well bore. In addition, formation fluids may comingle with the mud so as to reduce the percentage of the solids content. Regardless of how the solids content of the drilled mud is reduced, the result of a reduction of solids content can be disastrous.

If an operator should be unaware that the density of the drilling mud is decreasing as a result of a reduction in the percentage of solids content, he may well experience a "blowout" because the density of the mud is insufficient to prevent well fluids from errupting out of the well bore. Further, the density of the drilling mud may become so low as to become incapable of effectively removing cuttings, so as to impede the overall drilling operation and create the danger of the "drill string" becoming stuck in the borehole.

A variety of systems have been employed for monitoring the density of drilling mud during a drilling operation. By and large these density-monitoring systems have entailed densitometers providing a visual indication of mud density. As an operator observes variations in density, by noting the density reading on a dial or chart, he endeavors to insure that additional mud solids are added as required.

However, should an operator forget to monitor the densitometer "readout," he may fail to observe that the solids content of the mud has become dangerously low.

During normal drilling operations, the relative reduction in solids content of drilling mud will occur at a fairly low and constant rate. Thus, an operator may employ a low-volume handling system for adding solids content to the mud to maintain an optimum solids content level. This low-volume addition of solids to the mud enables the solids to be transferred into a mixing tank with a fairly high degree of precision, so as to avoid wasting the relatively expensive solid constituents of the mud such as barite.

However, in the event of an emergency, such as when a well bore intersects a gas pocket or a fluid-bearing formation, gas or liquid from a formation may mingle with the mud at such a rapid rate as to require a vastly accelerated addition of solids to the mud in order to prevent a "blowout."

A system for handling such an accelerated addition of solids material to drilling mud will, of necessity, lack the precision involved in normal systems for replenishing solids. Thus, for overall effectiveness and optimized efficiency, it would be desirable to provide a mud-mixing system having the capability of adding solids at a relatively low rate, with precision accuracy in blending being maintained, and having an alternative capacity to supply solids at an extremely high rate.

Oil field practice has developed to a point where radioactive-type densitometers are being used with increasing frequency. However, such densitometers, in the past, have often required recalibration where there were significant variations in the level of barite material in the drilling mud. For example, as is acknowledged in an article: "Radioactive Measurement of Fluid Density," authored by D. G. Hartweg, for presentation at the Petroleum Mechanical Engineering Conference in New Orleans, Louisiana (U.S.) during Sept. of 1960, it is noted that as much as a 15 percent error may be introduced into density readings as a result of changes in barite concentration, which changes are unaccompanied by recalibration of radioactive densitometers.

Thus, in the past, the nature of radioactive densitometers employed in oil field practices has been such as to introduce the possibility of substantial error in a mud supply system which would fluctuate from a low to a high barite concentration.

It should also be recognized that during mud-mixing operations, it is highly desirable to handle pulverulent solids, such as additives and barite, in such a manner as to maintain controllable and regulated flow, consistent with the generation of minimum dust.

Thus, it is a principal object of the present invention to provide an automated mud-mixing system for use in well operations and having a capacity to alternate between low and high rates of additions of solid materials to drilling mud.

It is likewise an object of the invention to provide such a mud-handling system utilizing a radioactive densitometer which is capable of providing accurate density measurements, without requiring recalibration, for both high and low rates of addition of solids material to the drilling mud.

Yet another principal object of the invention is to provide such an improved mud-handling system where, during normal or low-rate additions of solids material to drilling mud, optimum accuracy in the addition of solids is maintained so as to avoid wasting solids material.

Another object of the invention is to provide such an improved mud-mixing system uniquely incorporating a pneumatic system for conveying solids, operable with potentially independent but interacting high- and low-capacity systems, with the generation of dust being minimized during both high and low rates of solids addition to the mud.

In accomplishing at least some of the foregoing objects, there is presented through this invention an apparatus for mixing material, which apparatus includes mixing reservoir means and first discharge conduit means extending from the mixing reservoir means. A density-measuring means is operable to measure the density of material flowing through the first discharge conduit means. Return conduit means, included in the first discharge conduit means, is operable to return a portion of material from the first discharge conduit means to the mixing reservoir means.

The apparatus includes material supply means associated with second discharge conduit means. The second discharge conduit means is operable to discharge material from the supply means.

Also included in the apparatus is a first, relatively low-capacity mixing means for supplying material to the mixing reservoir means. This first mixing means includes a transfer reservoir means. A first branch conduit means is provided for conveying material from the second discharge conduit means of the supply means into the transfer reservoir means. A first means, operable in response to the density-measuring means, serves to control a flow of material through the second branch conduit means en route to the mixing means.

The apparatus further includes selectively operable actuating means for actuating the first and second mixing means.

Another individually significant aspect of this invention pertains to a combination including reservoir means and first supply means for supplying a high-density material, at a relatively low rate, to the reservoir means. A second supply means is provided for supplying high-density material to the reservoir means at a relatively high rate. A density-measuring means incorporated in the combination is operable to measure the density of material mixed in the reservoir means. This density-measuring means includes radioactive, density-measuring means operable, substantially independent of the composition of mixed material, to indicate mixed material density. The calibration of the radioactive density-measuring means is substantially the same when each of the first and second supply means is independently supplying material to the reservoir means.

Another significant facet of the invention entails a method for mixing material where relatively dense material is supplied at a relatively low rate to a reservoir. Relatively high-density material is subsequently supplied to the reservoir at a relatively high rate. The density of the mixed material in the reservoir is measured by radioactive density-measuring means such that the calibration of the radioactive density-measuring means may remain the same, regardless of whether material is being supplied to the reservoir at a high or low rate.

Other independently significant facets of the invention entail, in the context of the overall invention, unique method and apparatus aspects of the density-measuring system, involving a novel combination of photon energy levels, means for blocking and attenuating of photons as they pass through material, and means for maintaining a relatively low discrimination level in scintillation counting means upon which the photons are impinged.

Other aspects worthy of note pertain to novel features of the first and second supply means, each incorporating a pneumatically impelled solids material source, a system for adding material independent of the first and second supply means; and structural details of a control valve and solid material storage units.

DRAWINGS

In describing the invention, reference will be made to preferred embodiments illustrated in the appended drawings.

In the drawings.

PRINCIPAL COMPONENTS OF SYSTEM

Figure 1:
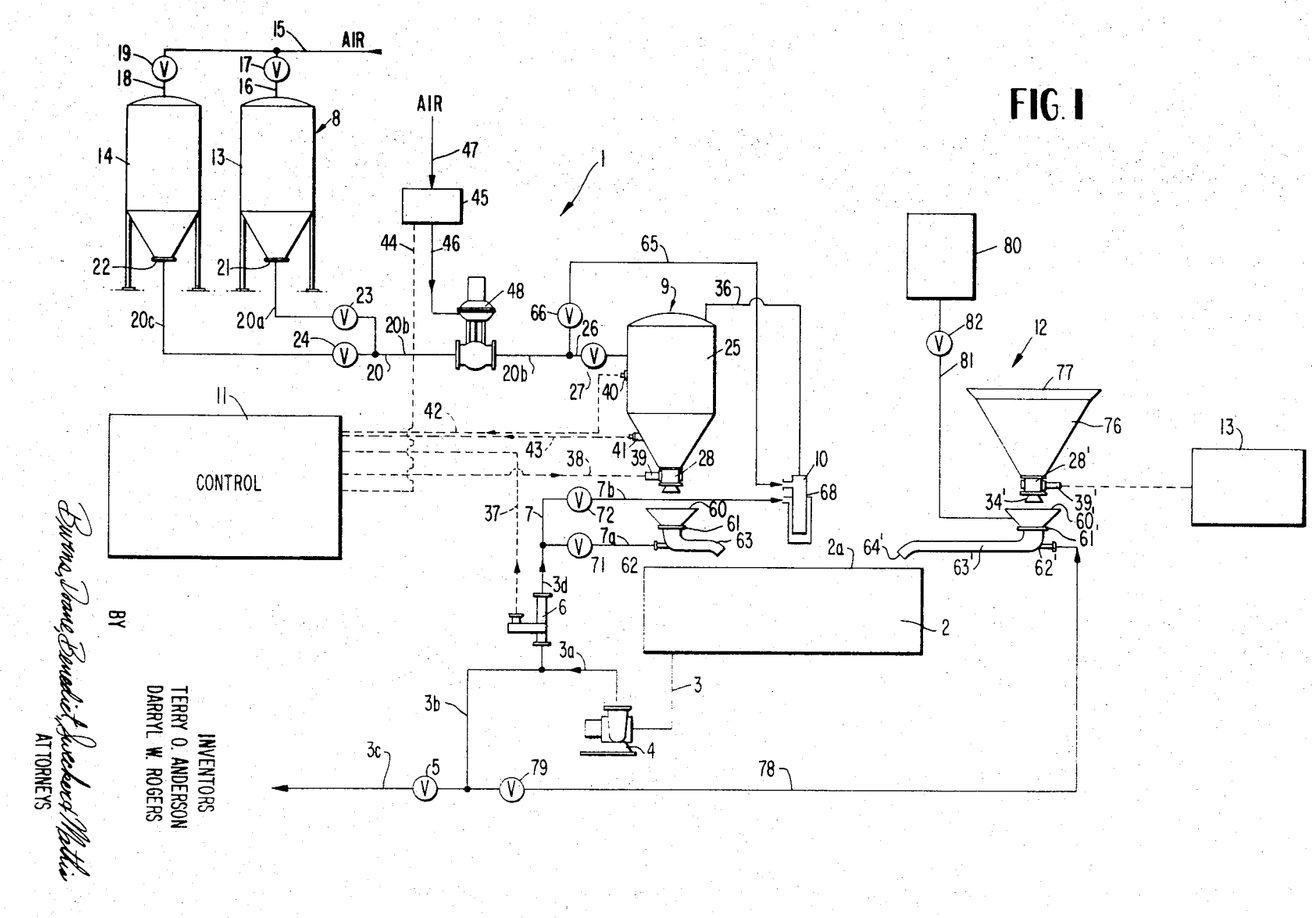
FIG. 1 provides, in a schematic or diagrammatic format, an illustration of the overall mud-mixing system of the present invention.

FIG. 1 illustrates, in a schematic format, the principal components of the mud mixing system 1 of the present invention.

System 1 includes a tanklike, mud-mixing reservoir 2. This tank 2 has an open, material-receiving, upper end 2a.

A first discharge conduit 3 extends from the underside of the mixing reservoir or mud tank 2. Discharge conduit 3 conveys mud from the mixing tank 2 to a conventional mud pump 4. Mud discharged from the pump 4 is intended to be conveyed through conduit portions 3a, 3b and 3c of the discharge conduit means 3 to a well site, not shown.

Flow of the mud to the well site may be controlled by a conventional valve 5, incorporated as shown in conduit section 3c.

A radioactive densitometer 6 is mounted, in series, in a conduit portion 3d of the discharge conduit network. A portion of the mud discharging through the conduit means 3 will flow through the densitometer 6 and conduit means 3d, and ultimately return to the upper end 2a of the mud tank 2 by way of a return conduit network 7.

System 1 additionally includes an assembly of pneumatically pressurized, pulverulent material reservoirs, defining solid material supply means 8.

Solid materials are conveyed from the supply means 8 to the upper end 2a of the mixing tank 2 in order to maintain an acceptably high solids content in the mud being mixed.

During normal operations, solids materials are transferred from the supply source 8 to the tank 2 by way of a first, relatively low-capacity, mixing means 9.

During emergency conditions, when it may become necessary to drastically and rapidly increase the solids contents of the mud in the mixing tank 2, pulverulent material is transferred from the supply means 8 to the tank 2 through a second, relatively high-capacity, solids transfer or densitometer means 10.

Solids material from the supply source 8 is channeled alternately through the low-capacity mixing means 9 or the high-capacity mixing means 10 under the influence of a manually operated control at the control station 11.

At various points in time during the mud mixing operation, it may be desirable to add certain additives to mud in the mixing tank 2. For example, it may be appropriate to add viscosity-modifying materials, "loss circulation" additives, etc. Such additives are transmitted to the open upper end 2a of the mud tank 2 by way of an additive supplying means 12. The operation of additive supplying means 12, under the influence of a manually adjustable control component 13, is entirely independent of the operation of the low-capacity mixing means 9 and the high-capacity mixing means 10. Thus, the system as a whole provides alternatively and selectively operable high- and low-capacity mixing systems for transferring the principal solids component of mud, such as barite, from a supply reservoir system 8 to the mud tank. Augmenting components 9 and 10, is the additive supply system 12.

The resultant density of mud being discharged from the reservoir 2 is monitored by the radioactive densitometer 6, continuously throughout the mud-mixing operation, and regardless of which of the units 9, 10 or 12 is in operation.

In a manner to be hereinafter described, the density-monitoring unit 6 provides automatic regulation of each of the low-capacity and high-capacity units 9 and 10, depending upon which unit is in operation at a particular point in time.

The mud and density controlled mud is conveyed to the well site through the section 3c of discharge conduit 3b.

SUPPLY SYSTEM

Supply system 8 includes a plurality of pulverulent material containing reservoirs 13 and 14. Reservoir 13 may contain pulverulent, mud-weighting material such as powdered barite. Reservoir 14 may contain other powdered mud components, usually having a density less than that of barite. Often the solid components contained in the reservoir 14 will comprise a solid material including a cation having an atomic number at least as low as about 20. The barium cation in barite has an atomic number of 56. Thus, the mud will be characterized by a wide range in atomic numbers giving rise to the problems of densitometer errors, previously noted.

Each of reservoirs 13 and 14 has its interior portion connected with a source of pressurized air through an air-supplying, conduit network 15. A branch conduit 16, controlled by a valve 17, supplies pressurized air to the interior of reservoir 13. Another branch conduit 18, controlled by a conventional valve 19, serves to supply pressurized air to the interior of reservoir 14.

The air supplied to the interior of the reservoirs 13 and 14 serves to aerate the pulverulent material contained within these reservoirs and convey the pulverulent material, in a generally fluidized form, out of the reservoirs 13 and 14, and through a second discharge conduit means 20.

Discharge conduit means 20 includes a branch portion 20a extending from the discharge outlet 21 of reservoir 13 to a main discharge section 20b. Discharge conduit means 20 additionally includes a branch conduit 20c, extending from the outlet of discharge mouth 22 of reservoir 14 to the main conduit portion 20b.

Manually operable valves 23 and 24 serve, respectively, to control the flow of aerated pulverulent materials through the conduits 20a and 20c. By selectively manipulating the valves 23 and 24, a desired blending of pulverulent materials being discharged from reservoirs 13 and 14 may be effected. This selectively blended solids material is pneumatically conveyed toward the mixing means 9 and 10, through the discharge conduit 20b.

At this point, it may be appreciated that this material aerating and conveying system may be generally of the type described in the Bailey U.S. Pat. No. 3,226,422 or the Hathorne U.S. Pat. No. 2,792,262, for example.

LOW-CAPACITY MIXING AND SUPPLY MEANS

For an overall appreciation of the manner in which the relatively low-capacity system 9 is incorporated in the overall operation, reference may be made to FIG. 1. However, to facilitate the comprehension of the mode of operation of the low-level system 9, reference may be made to FIG. 9 where the components of the low-level system 9 are shown in isolated relation. System 9 may be considered as a first supply means, including supply means 8.

Figure 9:
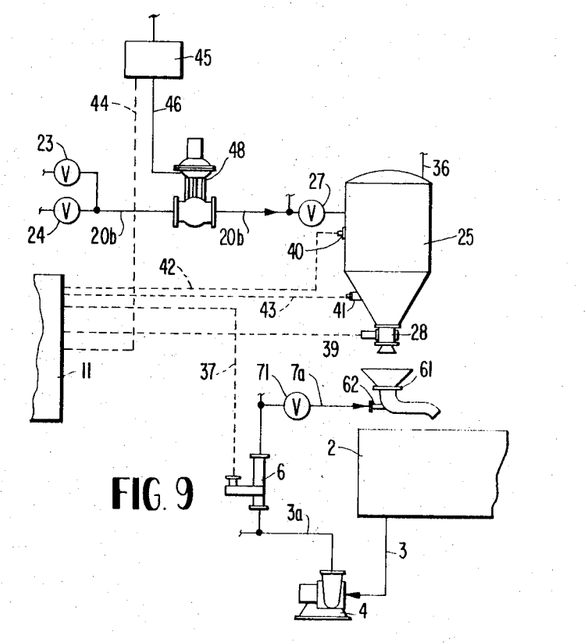
FIG. 9 provides a schematic or graphical representation of the components of the FIG. 1 system which are employed to effect a relatively low rate of addition of solids material to drilling mud.

The low-capacity mixing means 9 includes an enclosed tank or reservoir 25. A first branch conduit 26 serves to convey blended solids material from the discharge conduit 20b into the interior of the reservoir 25. Flow of pressurized air and pulverulent material through branch conduit 26 is controlled by a selectively and manually (or automatically) operable valve 27.

Pulverulent material is discharged from the lower end of the reservoir 25 through a vane-type outlet 28. Outlet 28, as shown in greater detail in FIG. 3, includes a vaned rotor 29 journaled in a generally cylindrical housing 30. Rotor 29 defines a series of mutually isolated, generally wedge-shaped pockets 31 circumferentially spaced about a rotor hub 32. The vane webs 33 of rotor 29, which define the pockets 31, cooperate with housing 30 to define a seal isolating the solids material discharge mouth 34 from the interior portion 35 of transfer reservoir 25.

Figure 3:
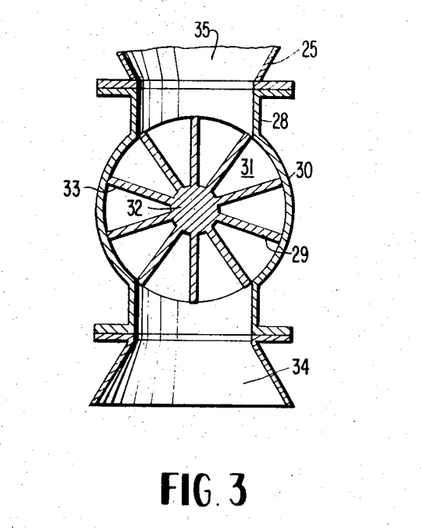
FIG. 3 provides an enlarged, vertically sectioned, elevational view of a vane-type pulverulent material discharge unit associated with each of the transfer and additive material reservoirs of the FIG. 1 system.

As will thus be appreciated, the vane means 28 provides an effective solids material metering, discharge device for effecting precision control over the discharging of solids material from the transfer reservoir 25. In addition, the vane means 28 provides an effective dust seal, preventing dust generated by the introduction of pressurized air and pulverulent material into the zone 35 from contaminating the external atmosphere of the tank 25.

As will be appreciated, it will be necessary to vent the interior space 35 so as to prevent an excessive buildup of pneumatic pressure which would block the conveying of material through the discharge conduit 20. Thus, a vent line 36 communicating with the space 35, may be provided at an upper portion of the reservoir 25. Vent conduit 36 communicates with the atmosphere and should be provided with an appropriate dust filter.

During the mud-mixing operation, while low-capacity system 9 is in operation, the densitometer 6 is continuously monitoring the discharge of mud from the tank 2 through the return conduit portion 3d of discharge network 3. The electrical signal generated by the radioactive densitometer 6, in a well-understood fashion, is fed through an electrical conduit 37 to the control station 11. Conventional control circuitry within the control station 11 converts the control signal, generated by densitometer 6, which may be digital in character, to a proportional control signal. This control signal is transmitted through electrical conduit 38 to an electrical motor 39. Motor 39 is coupled to the hub or drive shaft 32 of the vane rotor 29.

Thus, the rotor 29 will rotate at a rate dependent upon the density of mud flowing through the conduit 3d, as detected by the radioactive densitometer 6. The conventional circuitry within control unit 11 will provide an inversely proportional relationship between the radioactively detected mud density and the rate of vane or rotor rotation. That is to say, as the detected mud density decreases, the rate of rotation of the rotor 29 will increase so as to tend to restore the mud density to a predetermined value within a given time increment.

As will be appreciated, control unit 11 will include conventional, manually adjustable components for presetting a desired mud density. Once the desired mud density is introduced into the control network, components 28 and 6 will function as a servosystem, tending to maintain this desired mud density, comparing the densitometer generating signal with the desired density signal level.

With the control over the feeding of solids material to the mud tank 2 being effected by the vane means 28, it is necessary, in relation to the supply means 8, to merely ensure that there is an adequate supply of solids material within the interior 35 of the reservoir 25.

This control may be effected by control means, including a diaphragm or other type sensor 40 incorporated within interior space 35 for determining a desired uppermost level of solids material in the space 35. Another diaphragm or other type sensor 41 is incorporated in a lower portion of space 35 and is intended to monitor an acceptable, lowermost level of solids material within the tank 25. Sensors 40 and 41 generate control signals and these signals are transmitted to control unit 11 through signal transmitting conduits 42 and 43, respectively.

The signals transmitted by conduits 42 and 43, are transmitted through conventional circuitry within control unit 11 to an electrical, "valve off" or "valve on" signal. These electrical control signals are communicated through a signal-transmitting conduit 44 to a transducer 45. Transducer 45 comprises a conventional transducer for converting the electrical control signal to a pneumatic control signal. This pneumatic control signal regulates the pressure of air issuing from the transducer 45 through an air conduit 46. In this case, it will be appreciated that pressurized air, modulated by the transducer, is supplied to unit 45 through a supply conduit 47.

The pneumatic control signal passing through the conduit 46 passes to a flow control valve 48 incorporated in the section 20b of the discharge conduit network 20. Control valve 48 may comprise a Saunders valve available through the Fisher-Governor Company of Woodstock, Ontario Canada. Valves of this general type are described, for example, in a Boteler U.S. Pat. No. 3,310,282 and a Boteler et al. U.S. Pat. No. 3,145,473.

Figure 2:
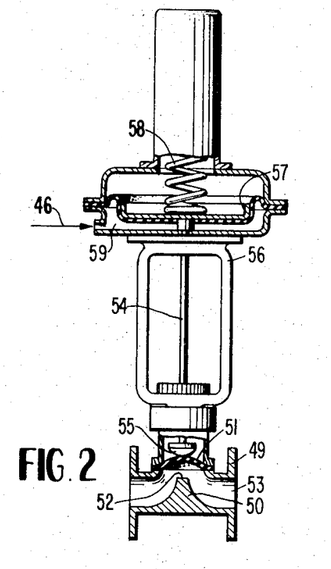
FIG. 2 provides an enlarged, partially sectioned vertical elevational view of a control valve incorporated in the FIG. 1 assembly and utilized to regulate the flow of air and pulverulent solids between supply tanks and a transfer reservoir of the FIG. 1 system.

Valve 48, as shown in FIG. 2, comprises a body 49 defining an in-series continuation of conduit section 20b. Valve body 49 provides an upwardly facing weir 50 which projects transversely across the interior of the second discharge conduit portion 20b.

A flexible diaphragm 51 is mounted in body 49 above the upper end 52 of weir 50. This diaphragm 51 is operable to move toward and away from the weir terminus 52 so as to close off or open the valve passage 53. A diaphragm-manipulating operating rod 54, having its lower end 55 coupled to the diaphragm 51, is telescopingly mounted in an upper valve housing 56. Operating rod 54 is connected with a diaphragm 57. A coil spring 58 tends to bias diaphragm 57 and valve rod 54 downwardly so as to urge the diaphragm 51 to a normally closed or "fail-safe" valve position. A pneumatic signal transmitted by transducer 45 through conduit 46 to a control signal generating chamber 59 acts on the underside of diaphragm 57. When the control signal indicates that the valve is to be opened, sufficient air pressure will be supplied to the chamber 59 so as to move the diaphragm 57 upwardly and allow the diaphragm 51 to be raised so as to open the passage 53.

In summary then, the "valve on" or "valve off" signals generated by the pulverulent material level sensors 40 and 41 will determine the nature of the pneumatic signal transmitted to the valve 48 while the mixing means 9 is in operation. This control system will ensure that the level of pulverulent material within the space 35 is maintained within acceptable limits.

Figure 4:
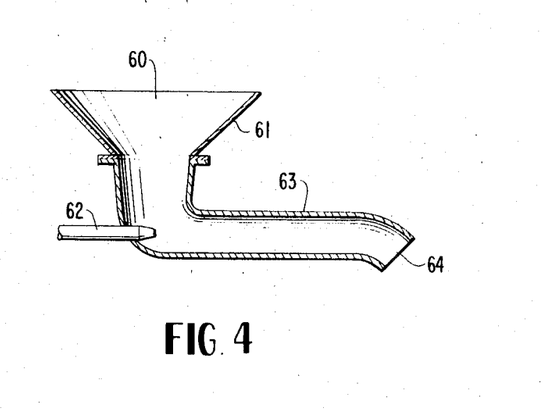
FIG. 4 provides an enlarged, vertically sectioned, elevational view of a pulverulent material impelling system associated with each of the transfer and additive material reservoirs of the FIG. 1 system.

The metered flow of pulverulent solids discharging from vane means 28 falls by gravity into the open upper end 60 of a hopper 61, shown in FIGS. 1 and 4. A first return branch conduit portion 7a of return conduit means 7 returns mud from conduit means 3d to the tank 2 by causing the mud to pass through a jet-defining nozzle 62. Jet-defining nozzle 62 is coaxially mounted at one end of a discharge conduit 63 of hopper 61. Thus, mud formed into a jet by nozzle 62 will comingle with solids material discharged by vane means 28 into hopper mouth 60. This mud jet will impel the pulverulent solids through the hopper 61, with the thus comingled mud and solids being discharged from conduit outlet 64 into the open upper end of the mud tank 2.

With the low-capacity materials-mixing system having been described, it now becomes appropriate to consider the relatively high-capacity system 10.

HIGH-CAPACITY MIXING AND SUPPLY MEANS

For an overall appreciation of the manner in which the relatively high-capacity system 10 is incorporated in the overall operation, reference may be made to FIG. 1. However, to facilitate the comprehension of the mode of operation of the high-level system 10, reference may be made to FIG. 10 where the components of the high-level system 10 are shown in isolated relation. System 10 may be considered as a second supply means, including supply unit 8.

Figures 7, 10, 11:
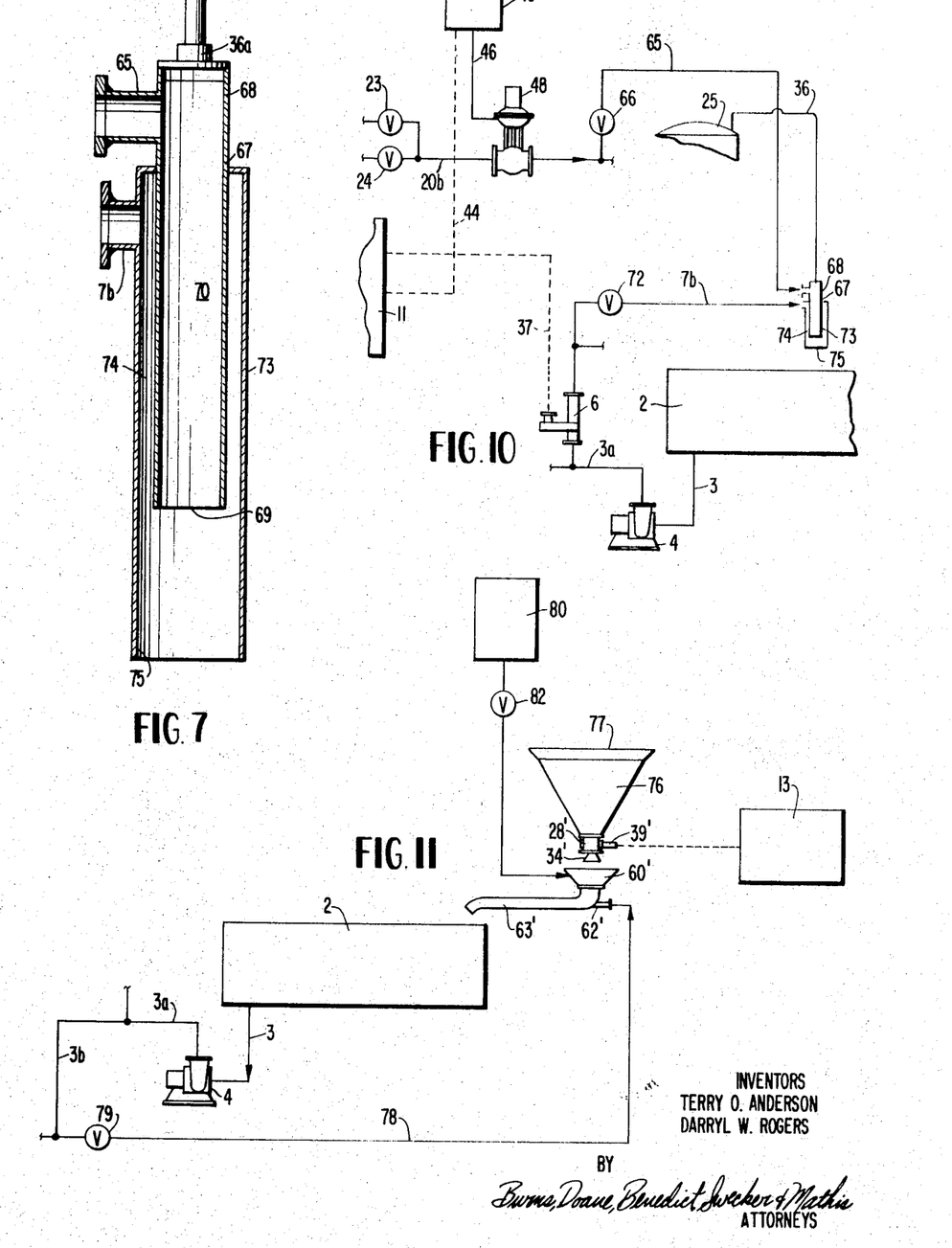
FIG. 7 provides an enlarged, vertically sectioned, elevational view of an eductor-type discharge unit incorporated in the FIG. 1 system and utilized to provide a shroud of mud encircling a flow of air and pulverulent material being discharged into the mixing reservoir of the FIG. 1 system.
FIG. 10 provides a schematic or graphical representation of the components of the FIG. 1 system which are employed to supply solids to drilling mud at a relatively high rate.
FIG. 11 provides a schematic or graphical representation of the components of the FIG. 1 system which are employed to supply additive material to drilling mud, independent of the material-adding components shown in FIGS. 9 and 10.

High-capacity mixing means 10 includes a second branch conduit means 65 which communicates with the second discharge conduit means 20b. As illustrated, second branch conduit 65 bypasses the transfer reservoir 25. Flow through the branch conduit 65 is controlled by a manually (or automatically) controlled valve 66.

Branch conduit 65 conveys pressurized air and entrained solids to an eductor unit 67 (shown in detail in FIG. 7).

Eductor unit 67 includes a vertically extending inner conduit 68 adapted to receive air and solids material at a "T-junction" at its upper end, from the branch conduit 65. In some instances, it may be appropriate to couple the terminus 36a of the vent conduit to the upper extremity of tube 68.

Tube 68 includes a lowermost outlet 69, disposed above the open mouth 2a of the mixing tank 2. Thus, pulverulent material conveyed to the interior 70 of the tube 68 will be discharged by gravity from the outlet 69 into the interior of mud tank 2.

A second return branch conduit 7b comprises a communicating portion of the return conduit network 7. At this point, it should be noted that flow through the conduit means 7 is constrained so as to flow through either the return branch conduit 7a or the branch conduit 7b depending upon the manual or automatic setting of the conventional valves 71 and 72 incorporated, respectively, in conduit sections 7a and 7b.

With valve 71 closed, and valve 72 open, mud will be returned from the discharge conduit portion 3d through return branch conduit 7b to the eductor unit 68.

Eductor unit 68 includes annular shroud 73 which encircles the inner tube 68 so as to define an annular mud-receiving cavity 74. Mud transmitted through return branch conduit 7b to annular space 74 will provide an annular mud stream, encircling the discharging air and pulverulent material issuing from the discharge mouth 69. The mud encircled air and pulverulent material will discharge from the eductor unit 68 through the open lower end 75 of shroud 73 and fall into the mixing tank 2.

Thus, during the high-capacity operation of the system 1, air-conveyed pulverulent material is conveyed from the supply means 8 so as to completely bypass the transfer reservoir 25, and flow through the high-capacity eductor unit 68. The discharge of the high flow of solids material is enshrouded by mud so as to maintain effective dust control.

During this high-level rate of solids material transfer, the rate of movement of solids is automatically controlled by the control valve 48.

During the operation of the high-capacity system 10, the densitometer 6 continuously monitors mud density, i.e., the density of mud flowing through the conduits 3d and 7b. The control signal generated by the densitometer 6 and conveyed through the signal-transmitting electrical conduit 37, is converted to a proportional electrical signal by conventional circuitry within the control system 11. This proportional control signal is converted to a proportional pneumatic control signal by transducer 45 and conveyed to the control chamber 59 of the valve 48.

Here again it will be appreciated that the pneumatic control signal will be inversely proportional to the mud density as detected by the densitometer 6. That is to say, as the detected density of the mud decreases, the intensity of the pneumatic signal will increase so as to permit a greater flow of solids material from the supply means 8 to the mixing tank 2 by way of eductor unit 68. In this manner, the components 48 and 6 will function as a servosystem so as to tend to maintain a desired high mud density. Control unit 6 contains conventional signal comparison means, by means of which the servosystem will function to maintain a desired density level in the mud. The desired mud density setting may be manually regulated in the control unit 11.

It will be appreciated that where the valve 48 is spring biased to an open position, and pneumatically biased to a closed position, the pneumatic signal will be proportional to the densitometer signal. In other words, the lower the detected density, in relation to a desired density, the lower will be the air pressure generated within the valve 48 so as to maintain the valve opening at a size commensurate with the rate of solids flow necessary to restore the desired mud density within a given time increment.

At this point, it should be noted that when the high-capacity system 10 is in operation, the valves 27 and 71 will be closed, while the valves 66 and 72 will be open.

Conversely, when the low-capacity unit 9 is in operation, the valves 27 and 71 will be open, while the valves 66 and 72 will be closed.

In some instances, where the vent tube 36 communicates with the eductor 68, it may be desirable to permit some flow through the branch conduit 7b, even when the low-capacity system 9 is in operation so as to provide a mud shroud encircling the air being vented from the tank 25 through the vent 36. Thus, with this arrangement, a mud shroud would serve to prevent dissimination into the atmosphere of any residue dust that might be present in the air stream.

With the high- and low-capacity systems 10 and 9, respectively, having been described, it now becomes appropriate to consider structural details of the additive supplying system 12.

ADDITIVE-SUPPLYING SYSTEM

For an overall appreciation of the manner in which the additive supplying system 12 is incorporated in the overall operation, reference may be made to FIG. 1. However, to facilitate the comprehension of the mode of operation of the additive supplying system 12, reference may be made to FIG. 11 where the components of the additive supplying system 12 are shown in isolated relation.

The additive supply system 12 as shown in FIG. 1, includes a hopper 76. Hopper 76 has an open upper end 77 into which bulk amounts of solid pulverulent additive material may be dumped. Hopper 76 may be provided with a vane-type discharge unit 28′ substantially identical to the vane means 28 associated with the transfer reservoir 25. The motor 39′ associated with the vane means 28′ is coupled to the independent control station 13. Thus, by manipulating the controls of station 13, an operator may cause the rotor of the vane means 28′ to operate at a desired rate so as to discharge solids from the outlet 34′ at any desired rate.

Solids discharged from the outlet 34′ of hopper 76 will fall by gravity into a mixing unit 60′ which may be considered to be functionally identical to the unit 60 associated with the transfer reservoir 25.

This unit 60′ provides a conduit 63′ for conveying additive material to the open upper end 2a of the mud tank 2. Thus, additive material is discharged by gravity from the outlet 64′ of conduit 63′ into the mud tank.

A third return branch conduit 78 is connected with discharge conduits 3b and 3c and serves to convey a portion of the mud flowing to the wellhead back to a jet defining nozzle 62′ of the unit 60′. The flow of mud through return conduit 78 is controlled by a manually operable valve 79.

Thus, mud conveyed to the nozzle 62′ forms a mud jet operable to impel additive material through the conduit 63′ to the outlet 64′.

It may be desired, in some instances, to add liquid-type additives to the mud. To facilitate the addition of such additives, a fluid additive reservoir 80 may be provided. Reservoir 80 communicates with hopper 61′ of unit 60′ by way of a conduit 81. The flow of liquid additive through the conduit 81 is controlled by a manually operable control valve 82.

At this point, the three major component supplying systems 9, 10 and 12 have been described. It now becomes appropriate to consider specific details of the unique densitometer 6.

RADIOACTIVE DENSITOMETER

Figures 5, 8:
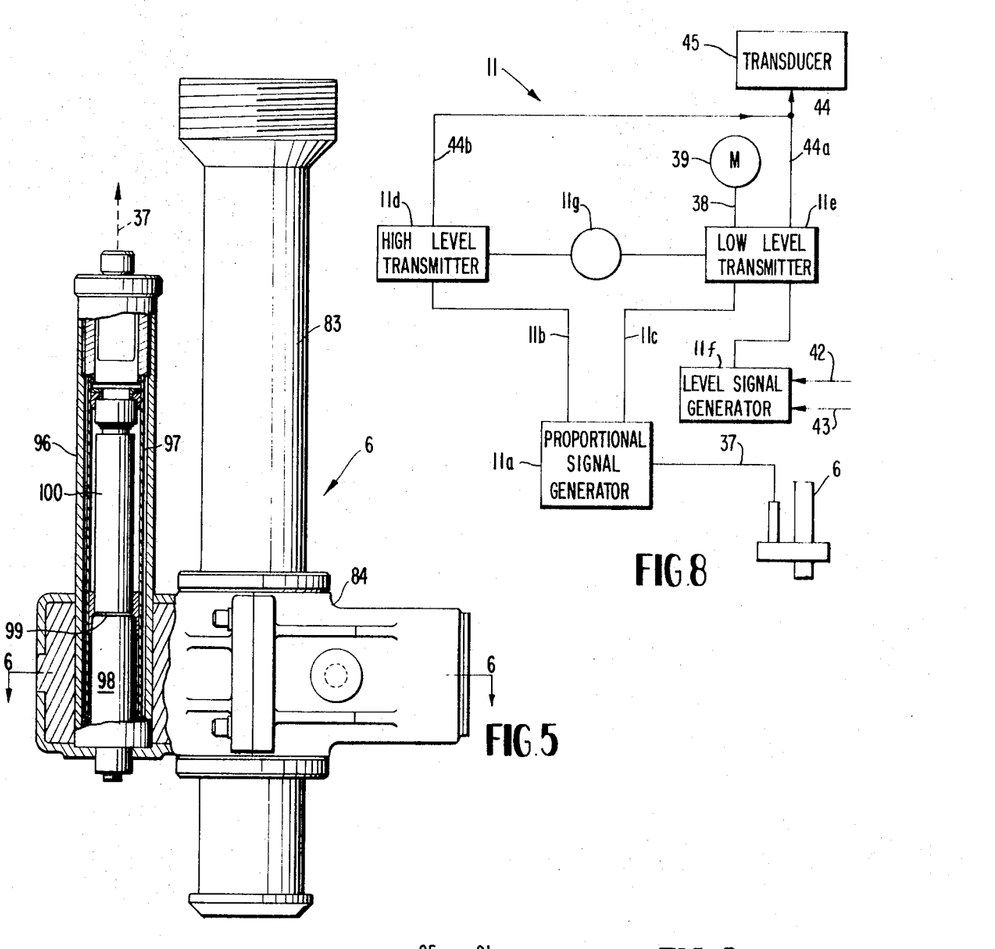
FIG. 5 provides an enlarged, partially sectioned, elevational view of a radioactive densitometer incorporated in the FIG. 1 system and employed to monitor the density of mud mixed in a mixing reservoir and discharging therefrom.
FIG. 8 provides, in schematic format, an illustration of a control network incorporated in the FIG. 1 system.
Figure 6:
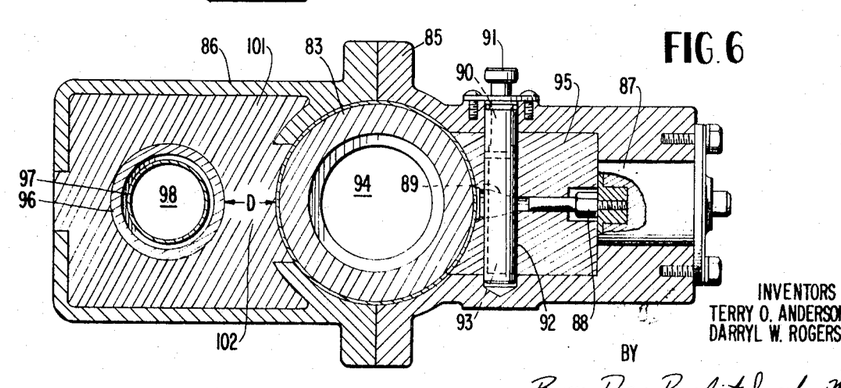
FIG. 6 provides a still further enlarged, transverse, horizontal and cross-sectional view of the densitometer shown in FIG. 5 as viewed along the section line 6–6.

The densitometer 6 comprises a novel radioactive densitometer of the type described in a pending U.S. application of Zimmerman et al., Ser. No. 729,291, filed May 15, 1968, now abandoned, entitled: "Methods and Apparatus for Measuring Slurry Density with Gamma Rays" and assigned to the assignee of the present application.

The densitometer 6, as shown in FIGS. 1, 5 and 6, includes a tubular body 83 incorporated, in series in, and defining a part of, conduit means 3d.

In the preferred embodiment, conduit means 3d and tubular body 83 extend vertically upwardly from pump discharge conduit 3a.

The densitometer 6 includes a generally horizontally extending body 84 including clamplike segments 85 and 86, clamped about the periphery of conduit section 83.

Housing portion 85 supports a detachable cartridge 87 including a photon emitter 88. In the preferred embodiment, the photon emitter 88 comprises a Cs 137 source having an energy level of about 0.661 Mev. It is contemplated that a photon emitter may be successfully employed where the energy level of the emitted photons is in the preferable energy level range of about 0.6 to about 1.33 Mev. or acceptably between 0.6 and 2 Mev.

Photons emitted from source 88 may pass through a generally frustoconical collimating passage 89. Collimating passage 89 is formed in a calibrating bar 90. In the manner described in the aforementioned Zimmerman patent, a bar handle 91 may be pulled outwardly of a bar-receiving recess 92, to move a calibrating portion 93 of bar 90 into alignment with the emitter 88.

However, during normal operation, the bar 90 is in the retracted position shown in FIG. 6, where the collimating passage 89 is coaxially aligned with the emission path of photons and diverges outwardly toward the central passage 94 of the tubular member 83. The aligned axes of emitter 88 and frustoconical collimating passage 89 perpendicularly intersect the central vertical axis of the passage 94.

The tungsten carbide shielding mass 95 encircles the emitter 88 but does not occupy the axial path between the emitter 88 and the central passage 94.

Body portion 86 supports an upright tubular component 96. Tubular component 96 contains a removable, tubular housing 97. Housing 97 supports, at its lower end, a scintillation counting means comprising a thallium-activated, sodium iodide crystal 98. Superposed within a tube 96 above the crystal 98, and optically coupled thereto by a silicon oil interface 99 is a photomultiplier unit 100. Photomultiplier unit 100 may comprise an EMI type 952–S photomultiplier tube.

In the conventional fashion, photomultiplier tube 100 generates an electric signal which may be digital in character, and is indicative of the absorption of photons by the mud flowing through the passage 94. The signal thus generated by the unit 100, which is indicative of mud density, is transmitted through the aforementioned electrical conduit 37 to the control unit 11.

Mounting tube 96 is supported in housing clamp portion 86 by a lead shielding mass 101. Lead shield 101 provides a lead barrier 102 interposed between the passage 94 and the sodium iodide crystal 98. This lead shield 102 should have a thickness D on the order of between about 1 and 1.5 centimeters. This lead shield is then operable to substantially block the passage of photons issuing from the mud in passage 94 which have a photon energy level of less than about 0.3 Mev. This lead shield 102 additionally attenuates the passage of photons issuing from the mud in passage 94, which photons have a photon energy level of less than about 0.45 Mev., by at least twice the degree of attenuation of photons issuing from passage 94 which have an energy level of about 0.6 Mev. or greater.

As described in the Zimmerman application, the photomultiplier tube is operated with an applied anode voltage operable to maintain a lower discrimination level of about 0.05 Mev.

The overall consequence of these structural and functional characteristics of the radioactive densitometer provides a densitometer which will accurately measure mud density over widely varying barite or additive content with an accuracy deviating from actual density which does not exceed about 0.3 pounds per gallon. This accuracy, of course, represents a substantial advance over the errors normally encountered where calibration is not adjusted in accordance with varying barite percentages, as discussed in the aforementioned Hartweg article.

OVERALL MODE OF OPERATION

During normal operations of the system 1, the relatively low-capacity mixing unit 9 will be in operation. The manner in which system 9 is operated, to the exclusion of system 10, may be appreciated by reference to the schematic illustration of control network 11 appearing in FIG. 8.

As shown in FIG. 8, the density signal is conveyed from the densitometer 6 along electrical conduit 37 to a proportional signal generator or transmitter 11a. The proportional control signal may be conveyed from unit 11a, in parallel along transmission paths 11b and 11c. Transmission path 11b passes through a transmission control unit 11d which electrically communicates with electrical signal transmitting conduit 44b.

Transmission means 11c communicates with another signal-transmitting control unit 11e. The signal transmitted along transmission path 11c exits from transmission control unit 11e so as to pass through electrical conduit 38 to the motor 39.

Transmitter 11d is provided with means for generating a control signal along path 44b which constitutes a comparison between the measured density signal and a signal indicative of a desired, predetermined and selectively variable mud density. Thus, the signal generated along path 44b will be a correction signal tending to induce the restoration of mud density to a desired preset level. The signal in unit 11d, representing desired mud density to be compared with actual measured density, may be manually adjusted, in relation to the independent operation of high-capacity unit 20.

Similarly, transmitter 11e may include an independently adjustable component for effecting a comparison between the signal representing measured mud density and a signal representing a predetermined density to be maintained while the unit 9 is in operation. As will be understood, the mud density to be maintained while unit 9 is in operation will generally be less than that to be maintained while unit 10 is in operation. Comparison between measured mud density and desired mud density in unit 11e, through conventional circuitry, will yield a mud density correcting signal to be transmitted along the route 38 to the motor 39.

The high and low material level signals transmitted by conduits 42 and 43 enter a material level, signal generator 11f. The resulting control signal, produced by conventional circuitry within unit 11f, i.e. either a "valve on" or "valve off" signal, is transmitted through transmission control station 11e into the transmission path 44a.

As shown in FIG. 8, transmission paths 44a and 44b both communicate with the transmission path 44 leading to the valve-controlling transducer 45. Obviously, however, only one of these paths will be in operation at any particular time.

Manually operable switch means 11g, incorporated in the control station 11, determines which of the transmission control means 11d and 11e is to be operable, to the exclusion of the other.

Thus, when low-level mixing unit 9 is operable, switch 11g is operated so as to cause unit 11d to block signal transmissions and permit unit 11e to transmit control signals.

With unit 11e operable, the transducer 45 functions, in response to the level detectors 40 and 41 to maintain an adequate material level in the reservoir 25. The signal transmitted to the motor 39 provides a flow of solids material to the tank 2, in accordance with the mud density measurement effected by the radioactive densitometer 6. As above noted, when unit 9 is in operation, valves 27 and 71 are open and valves 72 and 66 are closed.

When high-capacity unit 10 is to be activated, valves 71 and 27 are closed, while valves 72 and 66 are open. During this mode of operation, switch 11g is activated so as to cause the unit 11e to block transmission with the unit 11d permitting signal transmissions.

Thus, the density-correcting signal is transmitted to the transducer 45 and controls the flow of pulverulent material through the valve 48 in accordance with the density signal obtained from densitometer 6.

At any time during the operation of the system, the controller 13 of the additive supply system 12 may be activated so as to introduce selective amounts of additives into the mud mixing hopper 2. In this connection, it will be appreciated that the amounts of additives supplied by the component 12 will be limited so as to have little or no appreciable effect on the density of the overall mud system. Thus, the additive unit 12 will not significantly adversely affect the operation of the densitometer 6.

MAJOR ADVANTAGES AND SCOPE OF INVENTION

A major advantage of the invention resides in the provision of a mud-mixing system having selectively operable, and independently novel high- and low-capacity, combination aspects. Augmenting these components for supplying the principal weighting constituents of the mud is an independently operable additive supply system.

Thus, weighting material may be added to the mud at a relatively low rate with precision blending accuracy being maintained. Where emergency conditions arise, the system may be immediately converted to supply large quantities of weighting materials.

In this connection, it is contemplated that the low-capacity unit 9 will be able to discharge solids at a rate of between 0.15 and 3.0 cubic feet per minute. The high-capacity system 10 should have a capacity of at least several times this flow rate.

Regardless of whether weighting materials are being added at a low or high rate, maximum flexibility is maintained in that an operator may supply additives, such as thickeners or loss circulation materials, without altering the operation of the main mixing components.

The incorporation of the novel densitometer, in the context of the overall system, affords a particularly efficient automated mud-mixing system where high-density material such as barite may be added at varying rates without requiring recalibration of the densitometer and while maintaining high accuracy in density measurements.

The use of pneumatic conveying systems for transmitting pulverulent material provides an enclosed high-capacity mixing system, and minimizes the generation of dust. Dust generation is further controlled by utilizing vane-type feeders and mud shrouds.

The system 1 has been described from the standpoint of providing a mud-mixing arrangement operable to maintain a preselected mud density while the low-capacity unit 9 is in operation, and maintain an independently preselected and adjustable density when the high-capacity unit 10 is in operation.

In certain instances, the control signal generated by the radioactive densitometer 6 may be transmitted to a proportioner control mechanism to vary the ratio between solids and liquids in the reservoir 2. Where this modification of the system is utilized, the control signal generated by densitometer 6 would be transmitted to a conventional ratio controller containing a feed control mechanism for providing the desired addition of liquid to the reservoir 2.

In describing the invention, reference has been made to preferred embodiments. However, those skilled in the well art and familiar with the disclosures of this invention may well envision additions, deletions, substitutions or other modifications which would fall within the purview of the invention as defined in the appended claims.

We claim:

1. An apparatus for mixing material, said apparatus comprising:
   reservoir means;
   first supply means, including a transfer reservoir means, for conveying a high-density material, at a relative low rate, toward said reservoir means;
   second solids transfer supply means for conveying a high-density material toward said reservoir means at a relative high rate;
   means for pneumatically conveying said high-density material to said first and second supply means whereby said pneumatic means provides an enclosed system thereby preventing hazardous dust conditions; and
   density measuring means operable to measure the density of material mixed in said reservoir means, said density measuring means, including a combination of photon energy levels and further including a radioactive density-measuring means operable, substantially independent of the amount of said high-density material in said mixed material, to indicate mixed material density, with the calibration of said radioactive density-measuring means being substantially the same when each of said first and second supply means is independently supply material to said reservoir means.

2. An apparatus for mixing mud to be used in well-drilling operations, said apparatus comprising:
   mud-mixing, reservoir means;
   first supply means, including a transfer reservoir means, for supplying a high-density, pulverulent material, at a relative low rate, to said mud-mixing reservoir means;
   second solids transfer supply means for supplying a high-density pulverulent material to said mud-mixing reservoir means at a relatively high rate;
   density-measuring means operable to measure the density of mud mixed in said mud-mixing reservoir means, said density-measuring means including a combination of photon energy levels and further including a radioactive density-measuring means operable, substantially independent of the composition of said mud, to indicate mud density, with the calibration of said radioactive density-measuring means being substantially the same when each of said first and second supply means is independently supplying pulverulent material to said mud-mixing reservoir means;

means responsive to said density-measuring means for alternately regulating the flow of pulverulent material through said first and second supply means; and pneumatic conveying means for impelling pulverulent material through each of said first and second supply means whereby said pneumatic conveying means, providing an enclosed high-capacity mixing system, minimizes the generation of dust.

3. An apparatus for mixing mud to be used in well-drilling operations, said apparatus comprising:

mud-mixing, reservoir means;

first supply means for supplying a pulverulent barite-containing material, at a relatively low rate, to said mixing reservoir means;

second supply means for supplying a pulverulent barite-containing material to said mixing reservoir means at a relatively high rate;

density-measuring means operable to measure the density of mud in said mixing reservoir means, said density-measuring means including radioactive density-measuring means operable, substantially independent of the composition of said mud, to indicate mud density, with the calibration of said radioactive density-measuring means being substantially the same when each of said first and second supply means is independently supplying pulverulent material to said mixing reservoir means;

said density-measuring means including a source of photons having a photon energy of between about 0.6 and about 2 Mev. positioned adjacent a vertical flow of said mud, means for collimating the emission of photons from said source en route to said mud, shielding means for substantially blocking the passage of photons issuing from said mud which have a photon energy level of less than about 0.3 Mev. and attenuating the passage of photons issuing from said mud having a photon energy level of less than about 0.45 Mev. by at least twice the degree of attenuation of photons issuing from said mud which have a photon energy level of about 0.6 Mev. or greater, scintillation counting means, means for impinging photons which have been subjected to said blocking and attenuating on said scintillation counting means, and means maintaining a lower discrimination level of said scintillation counting means at least as low as about 0.05 Mev.;

means responsive to said density-measuring means for alternately regulating the flow of pulverulent material through said first and second supply means; and pneumatic conveying means for impelling pulverulent material through each of said first and second supply means.

4. An apparatus for mixing material, said apparatus comprising:

mixing reservoir means;

first discharge conduit means extending from said mixing reservoir means;

density-measuring means operable to measure the density of material through said first discharge conduit means;

return conduit means included in said first discharge conduit means and operable to return a portion of material from said first discharge conduit means to said mixing reservoir means;

material supply means including second, discharge conduit means operable to discharge material from said supply means;

first, relatively low-capacity, mixing means for supplying material to said mixing reservoir means, said first mixing means including transfer reservoir means, first branch conduit means for conveying material from said second discharge conduit means of said supply means into said transfer reservoir means, first means responsive to said density-measuring means for controlling the rate of discharge of material from said transfer reservoir means into said mixing reservoir means, second, relatively high-capacity, mixing means for supplying material to said mixing reservoir means, said second mixing means including second branch conduit means communicating with said second discharge conduit means of said supply means, said second branch conduit means bypassing said transfer reservoir means, second means, operable in response to said density-measuring means, to control a flow of air and material through said second branch conduit means en route to said mixing means; and selectively operable actuating means for actuating said first and second mixing means.

5. An apparatus for mixing mud for use in well-drilling operations, said apparatus comprising:

mixing reservoir means;

first discharge conduit means extending from said mixing reservoir means;

pump means operable to convey mud through said first discharge conduit means;

density-measuring means connected with said first discharge conduit means and operable to measure the density of mud flowing therethrough;

return conduit means included in said first discharge conduit means and operable to return a portion of mud flow, downstream of said density-measuring means, from said first discharge conduit means to said mixing reservoir means;

solid material supply means including air pressure containing, and enclosure-defining wall means operable to support a mass of pulverulent material, means for supplying pressurized air to the interior of said enclosure defining wall means, with said wall means being operable to maintain superambient pressure within said wall means, and second, discharge conduit means operable to discharge pressurized air and pulverulent material from said supply means;

first, relatively low-capacity, mixing means for supplying pulverulent material to said mixing reservoir means, said first mixing means including transfer reservoir means, first branch conduit means for conveying pressurized air and pulverulent material from said second discharge conduit means of said solid material supply means into said transfer reservoir means, first vane means defining a series of mutually isolated, rotatable pockets for discharging pulverulent material from said transfer reservoir means to said mixing reservoir means, said first vane means defining a seal between the interior of said transfer reservoir means and said mixing reservoir means, first means responsive to said density-measuring means for controlling the rate of discharge of pulverulent material from said transfer reservoir means by said first vane means, control means for controlling said conveying of pressurized air and pulverulent material through said first branch conduit means to said transfer reservoir means so as to regulate the amount of pulverulent material in said transfer reservoir means, first return branch conduit means communicating with said return conduit means, comingling means for comingling pulverulent material discharged by said first vane means and mud passing through said first return branch conduit means, said comingling means including first jet-defining means operable to form mud flowing through said return conduit means into a jet stream operable to impel pulverulent material discharged by said first vane means;

second, relatively high-capacity, mixing means for supplying pulverulent material to said mixing reservoir means, said second mixing means including second branch conduit means communicating with said second discharge conduit means of said solid material supply means, said second branch conduit means bypassing said transfer reservoir means, valve means, operable in response to said density-measuring means, to control a flow of pressurized air and pulverulent material through said second branch conduit means, outlet means for discharging pressurized air and pulverulent material from said second branch conduit means toward said mixing reservoir means, second return branch conduit means communicating with said return conduit means, annular stream-defining means communicating with said second return branch conduit means and operable to define an annular flow of mud encircling pressurized air and pulverulent material discharging from said outlet means;

additive supplying means including additive material reservoir means, second vane means operable to define a series of mutually isolated rotatable pockets for discharging segregated quantities of additive material from said additive material reservoir means, means for selectively controlling the rate of discharge of additive material by said vane means, additive material conduit means for conveying additive material, discharged by said second vane means, to said mixing reservoir means, and third, return branch conduit means connected with said first discharge conduit means, and second jet-defining means operable to constrain mud flowing through said third return branch conduit means into a jet stream operable to impel additive material through said additive material conduit means; and selectively operable actuating means for alternately actuating said first and second mixing means.

6. An apparatus for mixing mud for use in well-drilling operations, said apparatus comprising:

mixing reservoir means;

first discharge conduit means extending from said mixing reservoir means;

pump means operable to convey mud through said first discharge conduit means;

density-measuring means connected with said first discharge conduit means and operable to measure the density of mud flowing therethrough;

said density-measuring means including a source of photons having a photon energy of between about 0.6 and about 2 Mev. positioned adjacent a vertical flow of said mud, means for collimating the emission of photons from said source en route to said mud, shielding means for substantially blocking the passage of photons issuing from said mud which have a photon energy level of less than about 0.3 Mev. and attenuating the passage of photons issuing from said mud having a photon energy level of less than about 0.45 Mev. by at least twice the degree of attenuation of photons issuing from said mud which have a photon energy level of about 0.6 Mev. or greater, scintillation counting means, means for impinging photons which have been subjected to said blocking and attenuating on said scintillation counting means, and means maintaining a lower discrimination level of said scintillation counting means at least as low as about 0.05 Mev.;

return conduit means included in said first discharge conduit means and operable to return a portion of mud flow, downstream of said density-measuring means, from said first discharge conduit means to said mixing reservoir means;

solid material supply means including air pressure containing, and enclosure-defining wall means operable to support a mass of pulverulent material, means for supplying pressurized air to the interior of said enclosure-defining wall means, with said wall means being operable to maintain superambient pressure within said wall means, and second, discharge conduit means operable to discharge pressurized air and pulverulent material from said supply means;

said solid material supply means further including a first source of pulverulent, barite-containing material, a second source of pulverulent, additive material, and means for selectively blending materials from said first and second sources for passage through said second discharge conduit means;

first, relatively low-capacity, mixing means for supplying pulverulent material to said mixing reservoir means, said first mixing means including transfer reservoir means, first branch conduit means for conveying pressurized air and pulverulent material from said second discharge conduit means of said solid material supply means into said transfer reservoir means, first vane means defining a series of mutually isolated rotatable pockets for discharging pulverulent material from said transfer reservoir means to said mixing reservoir means, said first vane means defining a seal between the interior of said transfer reservoir means and said mixing reservoir means, first means responsive to said density-measuring means for controlling the rate of discharge of pulverulent material from said transfer reservoir means by said first vane means, control means for controlling said conveying of pressurized air and pulverulent material through said first branch conduit means to said transfer reservoir means so as to regulate the amount of pulverulent material in said transfer reservoir means, first return branch conduit means communicating with said return conduit means, comingling means for comingling pulverulent material discharged by said first vane means and mud passing through said first return branch conduit means, said comingling means including first jet-defining means operable to form mud flowing through said return conduit means into a jet stream operable to impel pulverulent material discharged by said first vane means;

second relatively high-capacity, mixing means for supplying pulverulent material to said mixing reservoir means, said second mixing means including second branch conduit means communicating with said second discharge conduit means of said solid material supply means, said second branch conduit means bypassing said transfer reservoir means, valve means, operable in response to said density-measuring means, to control a flow of pressurized air and pulverulent material through said second branch conduit means, said valve means including weir means extending partially transversely across said second discharge conduit means, diaphragm means operable to move transversely through the interior of said second discharge conduit means, generally toward and away from said weir means, and diaphragm moving means operable in response to said density-measuring means, outlet means for discharging pressurized air and pulverulent material from said second branch conduit means toward said mixing reservoir means, second return branch conduit means communicating with said return conduit means, annular stream-defining means communicating with said second return branch conduit means and operable to define an annular flow of mud encircling pressurized air and pulverulent material discharging from said outlet means;

additive-supplying means including
  additive material reservoir means,
  second vane means operable to define a series of mutually isolated rotatable pockets for discharging segregated quantities of additive material from said additive material reservoir means,
  means for selectively controlling the rate of discharge of additive material by said vane means,
  additive material conduit means for conveying additive material discharged by said second vane means to said mixing reservoir means, and
  third, return branch conduit means connected with said first discharge conduit means, and
  second jet-defining means operable to constrain mud flowing through said third return branch conduit means into a jet stream operable to impel additive material through said additive material conduit means; and selectively operable actuating means for alternately actuating said first and second mixing means.

7. A method for mixing material, said method comprising:
supplying a high-density material from first supply means, at a relatively low rate, to reservoir means;
supplying high-density material from second supply means to said reservoir means at a relatively high rate;
measuring the density of mixed material in said reservoir means, said measuring being effected with radioactive density-measuring means, having a source of photons with a photon energy level of between about 0.6 and about 2 Mev.;
regulating an alternate flow of material through said first and second supply means in response to said measuring, while maintaining a substantially constant calibration of said radioactive density-measuring means.

8. A method for mixing mud to be used in well-drilling operations, said method comprising:
supplying a pulverulent barite-containing material from first supply means, at a relatively low rate, to mud-mixing reservoir means;
supplying pulverulent, barite-containing material from second supply means to said mixing reservoir means at a relatively high rate;
measuring the density of mud in said mixing reservoir means, said measuring being effected by
  positioning a source of photons having a photon energy of between about 0.6 and about 2 Mev. adjacent a vertical flow of said mud,
  substantially blocking the passage of photons issuing from said mud which have a photon energy level of less than about 0.3 Mev., and
  attenuating the passage of photons issuing from said mud having a photon energy level of less than about 0.45 Mev. by at least twice the degree of attenuation of photons issuing from said mud which have a photon energy level of about 0.6 Mev. or greater, and
  impinging photons which have been subjected to said blocking and attenuating on photon-counting means; and alternately regulating the flow of pulverulent material through said first and second supply means in response to said measuring.

9. A method for mixing mud to be used in well-drilling operations, said method comprising:
supplying a pulverulent barite-containing material from first supply means, at a relatively low rate, to mud-mixing reservoir means;
supplying pulverulent, barite-containing material from second supply means to said mixing reservoir means at a relatively high rate;
measuring the density of mud in said mixing reservoir means, said measuring being effective by
  positioning a source of photons having a photon energy of between about 0.6 and about 2 Mev. adjacent a vertical flow of said mud,
  collimating the emission of photons from said source en route to said mud,
  substantially blocking the passage of photons issuing from said mud which have a photon energy level of less than about 0.3 Mev.,
  attenuating the passage of photons issuing from said mud having a photon energy level of less than about 0.45 Mev. by at least twice the degree of attenuation of photons issuing from said mud, which have a photon energy level of about 0.6 Mev. or greater,
  impinging photons which have been subjected to said blocking and attenuating on scintillation counting means, and
  maintaining a lower discrimination level of said scintillation counting means at least as low as about 0.05 Mev.;
alternately regulating the flow of pulverulent material through said first and second supply means in response to said measuring; and
pneumatically impelling said material through each of said first and second supply means.

10. A method for mixing mud to be used in well drilling operations, said method comprising:
supplying a pulverulent barite-containing material from first supply means, at a relatively low rate, to mud-mixing reservoir means;
supplying pulverulent, barite-containing material from second supply means to said mixing reservoir means at a relatively high rate;
measuring the density of mud in said mixing reservoir means, said measuring means being effected by
  positioning a Cs 137 source of photons having a photon energy of about 0.661 Mev. adjacent a vertical flow of said mud,
  collimating the emission of photons from said source en route to said mud,
  substantially blocking the passage of photons issuing from said mud which have a photon energy level of less than about 0.3 Mev.,
  attenuating the passage of photons issuing from said mud having a photon energy level of less than about 0.45 Mev. by at least twice the degree of attenuation of photons issuing from said mud, which have a photon energy level of about 0.6 Mev. or greater,
  impinging photons which have been subjected to said blocking and attenuating on a thallium-activated sodium iodide crystal, and
  maintaining a lower discrimination level of said scintillation counting means at least as low as about 0.05 Mev.;
regulating an alternate flow of pulverulent material through said first and second supply means in response to said measuring;
pneumatically impelling said material through each of said first and second supply means;

adding additional mud additive substances to said mixing reservoir means at a rate of addition independent of said measuring; and impelling at least a portion of said barite material with a mud jet en route to said reservoir means.

11. A method for mixing material, said method comprising:

supplying a high-density material from first supply means, at a relatively low rate, to reservoir means;

supplying high-density material from second supply means to said reservoir means at a relatively high rate;

impelling at least a portion of said high-density material with a mud jet en route to said reservoir means;

measuring the density of mixed material in said reservoir means, said measuring being effected with density-measuring means;

regulating an alternate flow of material through said first and second supply means in response to said measuring, while maintaining a substantially constant calibration of said density-measuring means.

12. A method for mixing material, said method comprising:

supplying a high-density material from first supply means, at a relatively low rate, to reservoir means;

supplying high-density material from second supply means to said reservoir means at a relatively high rate;

pneumatically impelling said high-density material through each of said first and second supply means;

measuring the density of mixed material in said reservoir means, said measuring being effected with measuring means; and regulating an alternate flow of material through said first and second supply means in response to said measuring, while maintaining a substantially constant calibration of said measuring means.

13. An apparatus for mixing material, said apparatus comprising:

reservoir means;

first supply means for supplying a high-density material, at a relatively low rate, to said reservoir means;

second supply means for supplying a high-density material to said reservoir means at a relatively high rate;

means for pneumatically conveying said high-density material through each of said first and second supply means; and density-measuring means operable to measure the density of material mixed in said reservoir means, said density-measuring means being operable, substantially independent of the composition of said mixed material, to indicate mixed material density, with the calibration of said measuring means being substantially the same when each of said first and second supply means is independently supplying material to said reservoir means.

14. An apparatus for mixing material, said apparatus comprising:

reservoir means;

first supply means for supplying a high-density material, at a relatively low rate, to said reservoir means, said first supply means including a transfer reservoir means;

second supply means for supplying a high-density material to said reservoir means at a relatively high rate; and density-measuring means operable to measure the density of material mixed in said reservoir means, said density-measuring means including density-measuring means operable, substantially independent of the composition of said mixed material, to indicate mixed material density, with the calibration of said density-measuring means being substantially the same when each of said first and second supply means is independently supplying material to said reservoir means.

15. An apparatus for mixing mud for use in well-drilling operations, said apparatus comprising:

mixing reservoir means;

first discharge conduit means extending from said mixing reservoir means;

pump means operable to convey mud through said first discharge conduit means;

density-measuring means connected with said first discharge conduit means and operable to measure the density of mud flowing therethrough;

return conduit means included in said first discharge conduit means and operable to return a portion of mud flow, downstream of said density-measuring means, from said first discharge conduit means to said mixing reservoir means;

solid material supply means including air pressure containing, and enclosure-defining wall means operable to support a mass of pulverulent material, means for supplying pressurized air to the interior of said enclosure-defining wall means, with said wall means being operable to maintain superambient pressure within said wall means, and second, discharge conduit means operable to discharge pressurized air and pulverulent material from said supply means; and mixing means for supplying pulverulent material to said mixing reservoir means, said mixing means including transfer reservoir means, branch conduit means for conveying pressurized air and pulverulent material from said second discharge conduit means of said solid material supply means into said transfer reservoir means, material-transferring seal means defining a seal between the interior of said transfer reservoir means and said mixing reservoir means, but operable to discharge pulverulent material to said mixing reservoir means, means responsive to said density-measuring means for controlling the rate of discharge of pulverulent material from said transfer reservoir means by said seal means, control means for controlling said conveying of pressurized air and pulverulent material through said branch conduit means to said transfer reservoir means so as to regulate the amount of pulverulent material in said transfer reservoir means, return branch conduit means communicating with said return conduit means, and comingling means for comingling pulverulent material discharged by said seal means and mud passing through said return branch conduit means, said comingling means including jet-defining means operable to form mud flowing through said return conduit means into a jet stream operable to impel pulverulent material discharged by said seal means.

16. An apparatus for mixing mud for use in well-drilling operations, said apparatus comprising:

mixing reservoir means;

first discharge conduit means extending from said mixing reservoir means;

pump means operable to convey mud through said first discharge conduit means;

density-measuring means connected with said first discharge conduit means and operable to measure the density of mud flowing therethrough;

said density-measuring means including a source of photons having a photon energy of between about 0.6 and about 2 Mev. positioned adjacent a vertical flow of said mud, means for collimating the emission of photons from said source en route to said mud, shielding means for substantially blocking the passage of photons issuing from said mud which have a photon energy level of less than abut 0.3 Mev. and attenuating the passage of photons issuing from said mud having a photon energy level of less than about 0.45 Mev. by at least twice the degree of attenuation of photons issuing from said mud which have a photon energy level of about 0.6 Mev. or greater, scintillation counting means, means for impinging photons which have been subjected to said blocking and attenuating on said scintillation counting means, and means maintaining a lower discrimination level of said scintillation counting means at least as low as about 0.05 Mev.;

return conduit means included in said first discharge conduit means and operable to return a portion of mud flow, downstream of said density-measuring means, from said first discharge conduit means to said mixing reservoir means;

solid material supply means including air pressure containing, and enclosure-defining wall means operable to support a mass of pulverulent material, means for supplying pressurized air to the interior of said enclosure-defining wall means, with said wall means being operable to maintain superambient pressure within said wall means, and second, discharge conduit means operable to discharge pressurized air and pulverulent material from said supply means;

said solid material supply means further including a first source of pulverulent, barite-containing material, a second source of pulverulent, additive material, and means for selectively blending materials from said first and second sources for passage through said second discharge conduit means; and mixing means for supplying pulverulent material to said mixing reservoir means, said mixing means including transfer reservoir means, branch conduit means for conveying pressurized air and pulverulent material from said second discharge conduit means of said solid material supply means into said transfer reservoir means, vane means defining a series of mutually isolated rotatable pockets for discharging pulverulent material from said transfer reservoir means to said mixing reservoir means, said vane means defining a seal between the interior of said transfer reservoir means and said mixing reservoir means, means responsive to said density-measuring means for controlling the rate of discharge of pulverulent material from said transfer reservoir means by said vane means, control means for controlling said conveying of pressurized air and pulverulent material through said branch conduit means to said transfer reservoir means so as to regulate the amount of pulverulent material in said transfer reservoir means, return branch conduit means communicating with said return conduit means, and comingling means for comingling pulverulent material discharged by said vane means and mud passing through said return branch conduit means, said comingling means including jet-defining means operable to form mud flowing through said return conduit means into a jet stream operable to impel pulverulent material discharged by said vane means.

17. An apparatus for mixing mud for use in well-drilling operations, said apparatus comprising:

mixing reservoir means;

first discharge conduit means extending from said mixing reservoir means;

pump means operable to convey mud through said first discharge conduit means;

density-measuring means connected with said first discharge conduit means and operable to measure the density of mud flowing therethrough;

return conduit means included in said first discharge conduit means and operable to return a portion of mud flow, downstream of said density-measuring means, from said first discharge conduit means to said mixing reservoir means;

solid material supply means including air pressure containing, and enclosure-defining wall means operable to support a mass of pulverulent material, means for supplying pressurized air to the interior of said enclosure-defining wall means, with said wall means being operable to maintain superambient pressure within said wall means, and second, discharge conduit means operable to discharge pressurized air and pulverulent material from said supply means; and mixing means for supplying pulverulent material to said mixing reservoir means, said mixing means including branch conduit means communicating with said second discharge conduit means of said solid material supply means, said branch conduit means bypassing said transfer reservoir means, valve means, operable in response to said density-measuring means, to control a flow of pressurized air and pulverulent material through said branch conduit means, outlet means for discharging pressurized air and pulverulent material from said branch conduit means toward said mixing reservoir means, return branch conduit means communicating with said return conduit means, and annular stream-defining means communicating with said return branch conduit means and operable to define an annular flow of mud encircling pressurized air and pulverulent material discharging from said outlet means.

18. An apparatus for mixing mud for use in well-drilling operations, said apparatus comprising:

mixing reservoir means;

first discharge conduit means extending from said mixing reservoir means;

pump means operable to convey mud through said first discharge conduit means;

density-measuring means connected with said first discharge conduit means and operable to measure the density of mud flowing therethrough;

said density-measuring means including a source of photons having a photon energy of between about 0.6 and about 2 Mev. positioned adjacent a vertical flow of said mud, means for collimating the emission of photons from said source en route to said mud, shielding means for substantially blocking the passage of photons issuing from said mud which have a photon energy level of less than about 0.3 Mev. and attenuating the passage of photons issuing from said mud having a photon energy level of less than about 0.45 Mev. by at least twice the degree of attenuation of photons issuing from said mud which have a photon energy level of about 0.6 Mev. or greater, scintillation counting means, means for impinging photons which have been subjected to said blocking and attenuating on said scintillation counting means, and means maintaining a lower discrimination level of said scintillation counting means at least as low as about 0.05 Mev.;

return conduit means included in said first discharge conduit means and operable to return a portion of mud flow, downstream of said density-measuring means, from said first discharge conduit means to said mixing reservoir means;

solid material supply means including air pressure containing, and enclosure-defining wall means operable to support a mass of pulverulent material, means for supplying pressurized air to the interior of said enclosure-defining wall means, with said wall means being operable to maintain superambient pressure within said wall means, and second, discharge conduit means operable to discharge pressurized air and pulverulent material from said supply means;

said solid material supply means further including
a first source of pulverulent, barite-containing material,
a second source of pulverulent, additive material, and
means for selectively blending materials from said first and second sources for passage through said second discharge conduit means; and
mixing means for supplying pulverulent material to said mixing reservoir means, said mixing means including
branch conduit means communicating with said second discharge conduit means of said solid material supply means, said branch conduit means bypassing said transfer reservoir means,
valve means, operable in response to said density-measuring means, to control a flow of pressurized air and pulverulent material through said branch conduit means, said valve means including
weir means extending partially transversely across said second discharge conduit means,
diaphragm means operable to move transversely through the interior of said second discharge conduit means, generally toward and away from said weir means, and
diaphragm moving means operable in response to said density-measuring means,
outlet means for discharging pressurized air and pulverulent material from said branch conduit means toward said mixing reservoir means,
return branch conduit means communicating with said return conduit means, and
annular stream-defining means communicating with said return branch conduit means and operable to define an annular flow of mud encircling pressurized air and pulverulent material discharging from said outlet means.

19. An apparatus for mixing material, said apparatus comprising:
reservoir means;
pneumatic means for conveying pneumatically impelled material toward said reservoir means;
means operable to flow with said pneumatically conveyed material toward said reservoir means;
means to comingle at least a portion of said material with a mud jet en route to said reservoir means; and
density-measuring means operable to measure the density of material mixed in said reservoir means, said density-measuring means including radioactive density-measuring means operable, substantially independent of the composition of said mixed material, to indicate mixed material density.

20. Apparatus for mixing material, said apparatus comprising:
means for supplying pulverulent material from supply means to mixing reservoir means;
means for measuring the density of mixed material in said mixing reservoir means, said measuring means including
means positioning a source of photons having a photon energy of between about 0.6 and 2 Mev. adjacent a flow of said mixed material,
means substantially blocking the passage of photons issuing from said mixed material which have a photon energy level of less than about 0.3 Mev.,
means attenuating the passage of photons issuing from said mixed material having a photon energy level of less than about 0.45 Mev. by at least twice the degree of attenuation of photons issuing from said mixed material which have a photon energy level of about 0.6 Mev. or greater, and
means for impinging photons which have been subjected to said blocking and attenuating on photon counting means;
means regulating a flow of pulverulent material through said supply means in response to said measuring;
means pneumatically impelling said pulverulent material through said supply means; and
means conveying at least a portion of said pulverulent material with liquid en route to said reservoir means.

21. A method for mixing material, said method comprising:
pneumatically impelling material toward reservoir means;
conveying said pneumatically impelled material with a liquid stream toward said reservoir means;
measuring the density of material mixed in said reservoir means with density-measuring means including radioactive density-measuring means operable, substantially independent of the composition of said mixed material, to indicate mixed material density; and
regulating the flow of said pneumatically impelled material in response to said measuring.

22. A method for mixing material, said method comprising:
supplying pulverulent material from supply means to mixing reservoir means;
measuring the density of mixed material in said mixing reservoir means, said measuring means being effected by
positioning a source of photons having a photon energy of between about 0.6 and 2 Mev. adjacent a flow of said mixed material,
substantially blocking the passage of photons issuing from said mixed material which have a photon energy level of less than about 0.3 Mev.,
attenuating the passage of photons issuing from said mixed material having a photon energy level of less than about 0.45 Mev. by at least twice the degree of attenuation of photons issuing from said mixed material, which have a photon energy level of about 0.6 Mev. or greater, and
impinging photons which have been subjected to said blocking and attenuating on photon counting means;
regulating a flow of pulverulent material through said supply means in response to said measuring;
pneumatically impelling said pulverulent material through said supply means; and
conveying at least a portion of said pulverulent material with a liquid en route to said reservoir means.